(12) United States Patent
Elwell et al.

(10) Patent No.: US 6,231,285 B1
(45) Date of Patent: May 15, 2001

(54) POP-UP TIE DOWN DEVICE

(75) Inventors: James P. Elwell, Ankeny, IA (US); James L. Worrell, DeKalb, IL (US)

(73) Assignee: Putco, Inc., Story, IA (US)

( * ) Notice: Subject to any disclaimer, the term of this patent is extended or adjusted under 35 U.S.C. 154(b) by 0 days.

(21) Appl. No.: 09/372,565

(22) Filed: Aug. 11, 1999

(51) Int. Cl.$^7$ ...................................................... B60P 7/08
(52) U.S. Cl. ........................ 410/107; 410/102; 410/106; 410/110; 410/111; 410/115
(58) Field of Search ................................... 410/101, 102, 410/106, 107, 108, 109, 110, 111, 112, 113, 115, 116; 296/43; 24/265 CD, 115 K; 248/499

(56) References Cited

U.S. PATENT DOCUMENTS

| | | | | |
|---|---|---|---|---|
| 2,729,418 | * | 1/1956 | Maynard | 410/102 |
| 3,102,708 | * | 9/1963 | Crain | 410/107 |
| 3,722,910 | * | 3/1973 | Heckenlaible | 410/107 |
| 4,072,113 | * | 2/1978 | Thurston | 410/107 |
| 4,715,754 | * | 12/1987 | Scully | 410/107 |
| 4,741,653 | * | 5/1988 | Schmidt | 410/111 |
| 4,762,449 | * | 8/1988 | St. Pierre et al. | 410/107 |
| 4,903,876 | * | 2/1990 | Bott | 410/107 X |
| 4,945,849 | * | 8/1990 | Morris et al. | 410/111 |
| 5,476,349 | * | 12/1995 | Okland | 410/106 |
| 5,873,688 | * | 2/1999 | Wheatley | 410/106 |
| 5,904,458 | * | 5/1999 | Bundy | 410/106 |
| 5,971,684 | * | 10/1999 | Wang | 410/107 |
| 6,065,917 | * | 5/2000 | Shambeau et al. | 410/107 |

* cited by examiner

Primary Examiner—Stephen T. Gordon
(74) Attorney, Agent, or Firm—Zarley, McKee, Thomte, Voorhees & Sease PLC

(57) ABSTRACT

A pop-up tie down device includes a body member having an attachment member for securing the body member to the stake hole of a side wall in a vehicle carrier. The anchor member includes a cavity which holds a pop-up tie down device. The pop-up tie down device is movable from a retracted position within the cavity to an extended position wherein a portion of the tie down device protrudes from the cavity.

9 Claims, 3 Drawing Sheets

POP-UP TIE DOWN DEVICE

BACKGROUND OF THE INVENTION

This invention relates to a pop-up tie down device and method for using same.

Various types of tie-down devices have been provided for mounting in the side wall stake holes of a vehicle carrying compartment. An example of such a tie down device is shown in U.S. Pat. No. 5,476,349 which shows an elongated rail having anchor members that are mounted in the stake holes. The anchor members in U.S. Pat. No. 5,476,349 include a tie-down opening extending there through.

Therefore, a primary object of the present invention is the provision of a pop-up tie down device and method for using same.

A further object of the present invention is the provision of a pop-up tie down device which includes a pop-up tie down member that can be stored in an inoperative position substantially hidden from view.

A further object of the present invention is the provision of a pop-up tie down device having a pop-up tie down member which can be moved from its inoperative position to an extended operative position wherein it is accessible for tying cords or lines to objects in the carrying compartment.

A further object of the present invention is the provision of an improved pop-up tie down device which has a good aesthetic appearance, which is durable in use, and which is efficient to manufacture.

A further object of the present invention is the provision of a pop-up tie down device which can be easily manually moved from its inoperative position to its operative position.

SUMMARY OF THE INVENTION

The foregoing objects may be achieved by a pop-up tie down device for use with a flexible line and a vehicle having a carrying compartment with side walls. The tie down device includes a body member having a first end, a second end, and an intermediate portion therebetween. A tie down member is moveably mounted to the body member for movement between an operative position and an inoperative position. The tie down member is retentively connected to the body member when in the operative position and is shaped to permit the flexible line to be attached thereto. A mounting member is connected to the body member and is also adapted to be connected to one of the side walls of the vehicle for attaching the tie-down member and the body member to the side wall of the vehicle.

One feature of the present invention is the provision of a slide track in the body member which retentively holds the tie down member and permits the tie down member to slide from its operative to its inoperative positions.

Another feature of the present invention is the provision of a slide track which is a cavity within the body member and which permits the tie down device to move from a retracted position located completely within the cavity to an operative position wherein a portion of the tie down member extends outwardly from the cavity for receiving a tie down cord or line.

Another feature of the present invention is the provision of upper and lower surfaces to the tie down member, which form continuations of the outer surface of the body member when the tie down member is in its recessed position.

DETAILED DESCRIPTION OF THE PREFERRED EMBODIMENT

Figure 1:
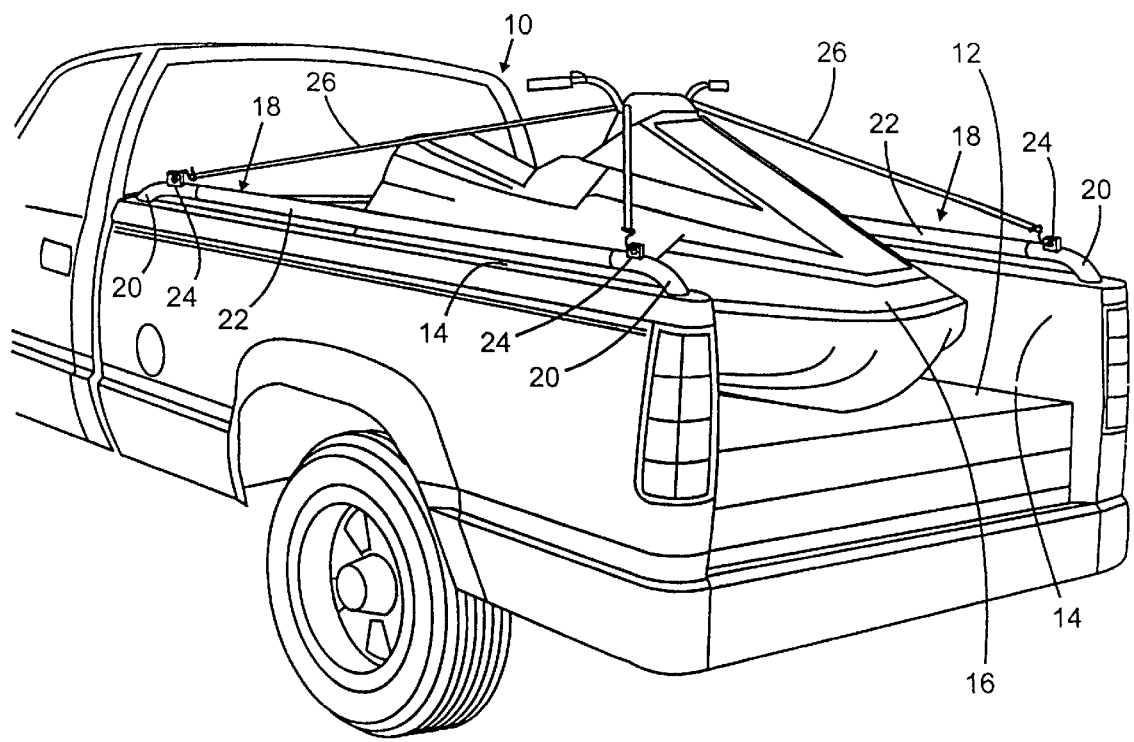
FIG. 1 is a perspective view of a vehicle having the pop-up tie down devices of the present invention mounted thereon.
Figure 2:
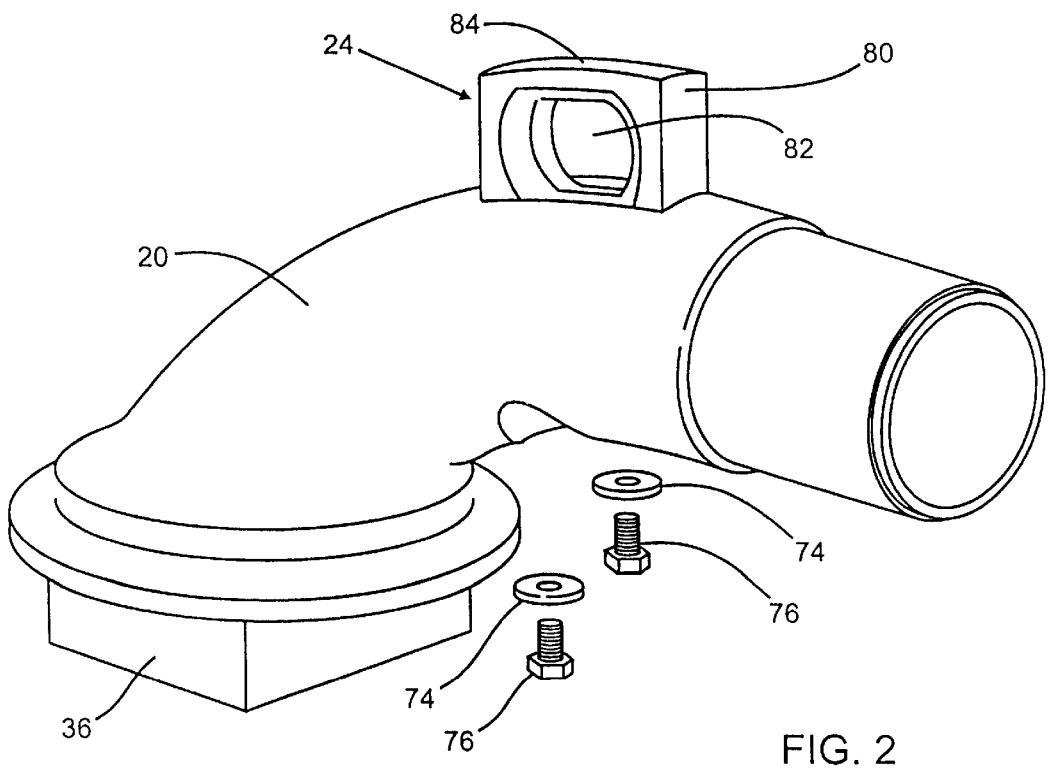
FIG. 2 is a perspective view of one of the end body members or anchor members of the present invention.

The description below and the drawings illustrate the preferred embodiment of applicant's invention. However, many features of the invention may be varied without detracting from the invention, and the description of the preferred embodiment is not intended to limit applicant's invention to the specific structure described herein and shown in the drawings.

Referring to FIG. 1 the numeral 10 generally designates a pick-up truck having a carrying compartment 12 with side walls 14. A load item 16 is shown in the carrying compartment.

Mounted to the side walls 14 are a pair of tie down rails 18 each of which comprises a pair of end bodies 20 mounted in the stake holes 48 (FIGS. 3 and 4) and a tube 22 which extends between the pairs of end bodies 20.

Each of the end bodies 20 include a pop-up tie down member 24 to which can be attached a tie line or bunge cord 26 tied to the load 16 to prevent movement of the load 16 in the carrying compartment 12.

Figure 3:
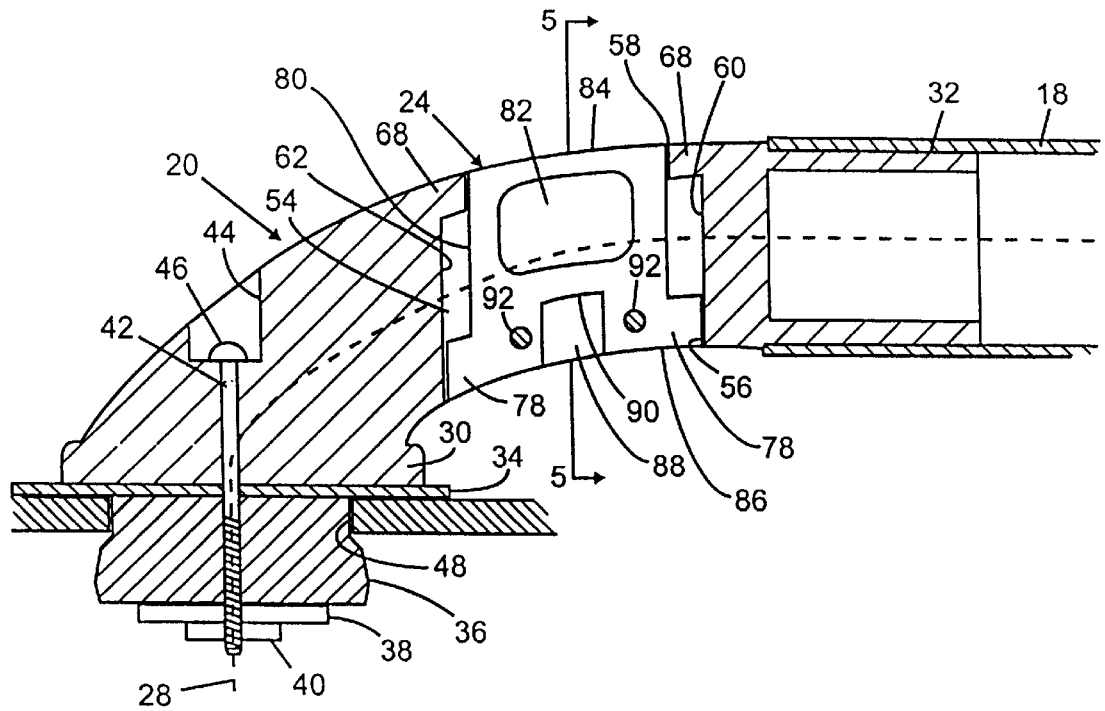
FIG. 3 is a sectional view of one of the end body members of the present invention.
Figure 4:
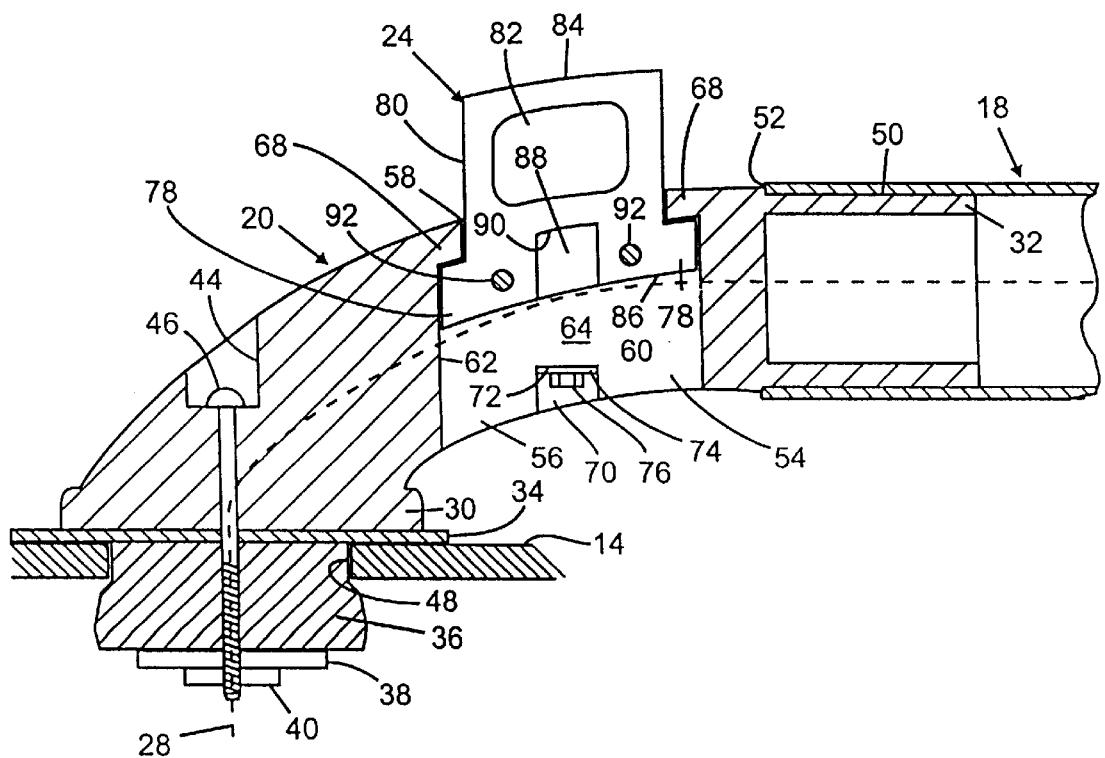
FIG. 4 is a sectional view similar to FIG. 3, but showing the tie down member in its extended position.

Referring to FIGS. 3 and 4 the end body 20 is elongated and follows a curved center line 28. Line 28 extends from an anchor end 30 of the body member to a tube receiving end 32 of the body member. The center line 28 curves throughout an angle of approximately 90° as it progresses from the anchor end 30 to the tube receiving end 32. A mounting plate 34 engages the anchor end 30, and an elastomeric member 36 fits within the stake hole 48. Below the elastomeric member 36 is a compression washer 38. A bolt 42 includes a bolt head 46 which is recessed within a counter bore 44 of the body member, and which is attached to a nut 40 below compression washer 38. Tightening of the bolt 42 causes compression of the elastomeric member 36 to retentively attach the body member 20 to the stake hole 48.

While the specific attachment member shown in the drawings is a compressible elastomeric member, other means of attachment may be used without detracting from the invention. For example, the anchor member could be clamped to the side wall, it could be bolted to the side wall, or it could be attached in any of a variety of ways. The method of attachment of the anchor member to the side wall or to the stake hole does not comprise the present invention.

The tube receiving end 32 of body member 20 includes a reduced diameter portion 50 and an axially presented shoulder 52. Tube 22 is telescopically fitted over the reduced diameter portion and abuts against the shoulder 52 to provide a smooth continuation of the outer surface of the body member 20.

Figure 5:
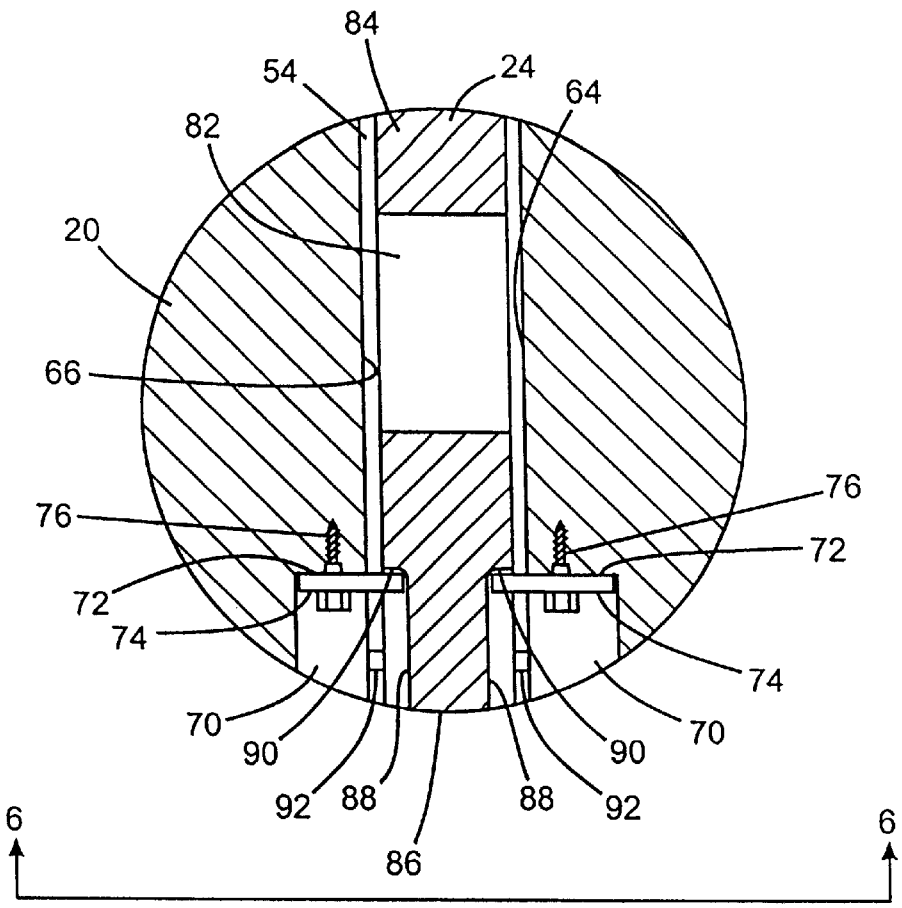
FIG. 5 is a sectional view taken along line 5—5 of FIG. 3.
Figure 6:
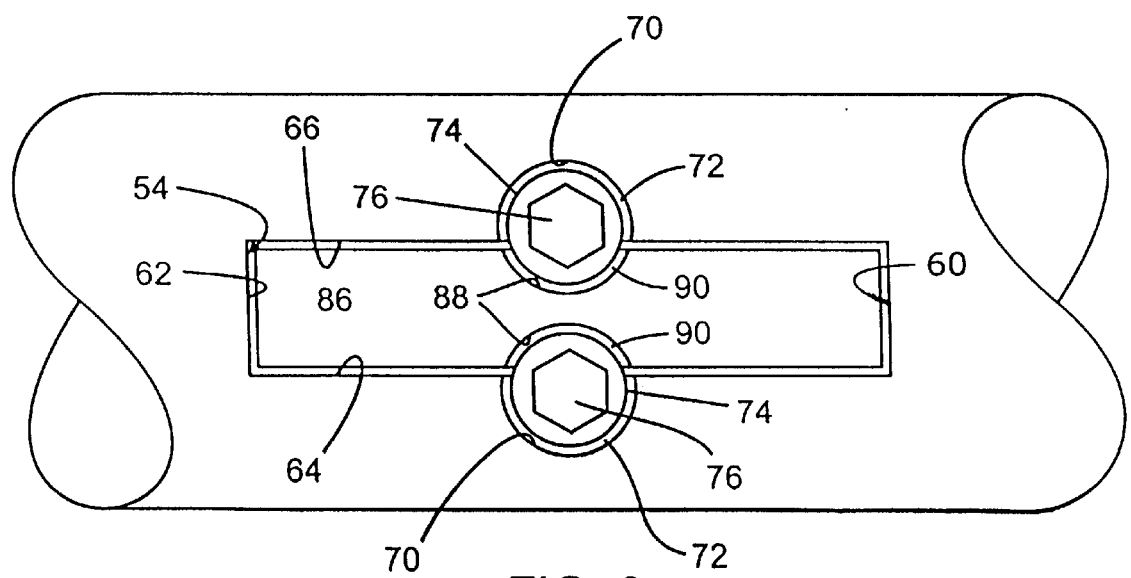
FIG. 6 is a bottom plan view taken along line 6—6 of FIG. 5.

Extending vertically through the body member 20 between the opposite ends 30, 32 is a slide cavity 54 having an opened lower end 56 and an open upper end 58. Cavity 54 also includes a front wall 60 and a rear wall 62 as well as opposite side walls 64, 66 (FIG. 5). At the open upper end 58 of cavity 54 are a pair of inwardly extending lips 68.

In the side walls 64, 66 of the cavity, adjacent the lower end thereof, are a pair of lower partial bore indentations 70, each of which terminate in an inner end or shoulder 72. Fitted against each of the inner ends 72 is a stop washer 74 which is held in place by a screw 76.

Tie down member 24 includes forwardly and rearwardly extending lower lips 78 at its lower end, and a shank portion 80 extending upwardly therefrom. Extending transversely through the shank portion 80 is an eyelet 82 to which a cord or line may be tied or otherwise attached. Tie down member 24 includes an upper curved surface 84 which, when the tie down member 24 is in its retracted position as shown in FIG. 3 forms a smooth uninterrupted continuation of the outer curved surface of the anchor body 20. Anchor member 24 also includes a lower curved surface which, when the tie down member 24 is in its retracted position as shown in FIG. 3, forms a smooth continuation of the outer surface of the body member 20. Thus when the tie down member 24 is in its retracted position shown in FIG. 3, it is completely contained within the cavity 54, and its upper and lower surfaces 84, 86 form smooth continuations of the outer surface of the body member 20. The sizes of the upper end opening 58 and the lower end opening 56 of the cavity 54 are substantially the same as the sizes of the upper and lower surfaces 84, 86 of the tie down member 24. Consequently, when the tie down member 24 is in its recessed position it is hidden from view, and the upper and lower surfaces 84, 86 appear to be part of the outer surface of the body member 20.

A pair of side recesses 88 are formed in the side walls of tie down member 24 as can be seen in FIG. 5. At the upper ends of each of these side recesses is a downwardly presented stop shoulder 90 which engages or contacts by abutment the stop washers 74 when the tie down member 24 is in its retracted position shown in FIG. 5. This engagement prevents the tie down member from sliding downwardly beyond the position shown in FIG. 5.

Extending through the tie down member 24 are a pair of friction bearings 92 which are preferably made of an elastomeric material and which engage the side walls 64, 66 of the cavity 54 so as to provide a slight friction between the side walls 64, 66 of cavity 54 and the tie down member 24. This slight friction causes the tie down member 24 to retain its position within the cavity 54. However, the tie down member 24 can be manually moved from its retracted position shown in FIG. 3 to its extended position shown in FIG. 4. When in this extended position shown in FIG. 4, the friction bearings 92 hold the tie down member 24 against sliding downwardly in response to gravity.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A tie down device for use with a flexible line and a vehicle having a carrying compartment with side walls, said tie down device comprising:

a body member having a first end, a second end, and an intermediate portion therebetween;

a tie down member movably mounted to said body member for movement between an operative position and an inoperative position;

said tie down member being retentively connected to said body member when in said operative position;

said tie down member being shaped to permit said flexible line to be attached thereto;

a mounting member connected to said body member also being adapted to be connected to one of said side walls of said vehicle for attaching said tie down member and said body member to said one side wall of said vehicle; and a first stop surface fixed on said body member and a first stop surface fixed on said tie down member which engage one another when said tie down member is in said inoperative position, and a second stop surface fixed on said body member and a second stop surface fixed on said tie down member which engage one another when said tie down member is in said operative position.

2. A tie down device according to claim 1 wherein said body member includes a slide track formed therein, said tie down member being retentively and movably retained in said slide track for movement between said operative and said inoperative positions.

3. A tie down device according to claim 2 wherein said slide track includes first and second ends, said tie down member being completely within said slide track between said first and second ends thereof when said tie down member is in said inoperative position.

4. A tie down device according to claim 2 and further comprising a pair of frictional bearings extending through said tie down member so as to frictionally engage said slide track in said body member.

5. A tie down device according to claim 4 wherein said frictional bearings are cylindrical pins made of an elastomeric material.

6. A tie down device for use with a flexible line and a vehicle having a carrying compartment with side walls, said tie down device comprising:

a body member having a first end, a second end, and an intermediate portion therebetween;

a tie down member movably mounted to said body member for movement between an operative position and an inoperative position;

said tie down member being retentively connected to said body member when in said operative position;

said tie down member being shaped to permit said flexible line to be attached thereto;

a mounting member connected to said body member also being adapted to be connected to one of said side walls of said vehicle for attaching said tie down member and said body member to said one side wall of said vehicle;

said body member including a slide track formed therein, said tie down member being retentively and movably retained in said slide track for movement between said operative and said inoperative positions;

said slide track including first and second ends, said tie down member being completely within said slide track between said first and second ends thereof when said tie down member is in said inoperative position; and said body member including first and second opposite body surfaces and said tie down member including first and second opposite tie down member surfaces which form substantially a continuation of said first and second opposite body surfaces when said tie down member is in said inoperative position.

7. A tie down device according to claim 6 wherein said mounting member is attached to said first end of said body member.

8. A tie down device according to claim 7 wherein said body member includes a longitudinal axis which extends a first direction adjacent said first end of said body member and which extends a second direction approximately perpendicular to said first direction adjacent said second end of said body member.

9. A tie down device for use with a flexible line and a vehicle having a carrying compartment with side walls, said tie down device comprising:

a body member having first and second opposite ends and an intermediate portion extending therebetween;

said body member having a cavity therein with a first opening providing communication from outside said cavity to the interior of said cavity;

a tie down member fitted within said cavity and being movable therein from a retracted position completely within said cavity to an extended position wherein a portion of said tie down member is outside said cavity;

said portion of said tie down member outside said cavity when said tie down member is in said extended position having an opening for receiving a flexible elongated tie member therein;

said body member retentively engaging said tie down member when said tie down member is in said extended position to prevent said tie down member from exiting said cavity and separating from said body member;

said cavity having a second opening providing communication from outside said cavity to the interior of said cavity;

said tie down member including a first surface and said body member including an exterior surface, said first surface of said tie down member forming a substantial continuation of said exterior surface adjacent said first opening when said tie down member is in said retracted position; and said tie down member including a second surface which forms a substantial continuation of said exterior surface of said body member adjacent said second opening when said tie down member is in said retracted position.

\* \* \* \* \*